US006357132B1

(12) United States Patent
Banks

(10) Patent No.: US 6,357,132 B1
(45) Date of Patent: Mar. 19, 2002

(54) BOOM POSITION DETECTION SYSTEM

(76) Inventor: William W. Banks, 10153 Vantage Point Ct., New Market, MD (US) 21774

(*) Notice: Subject to any disclaimer, the term of this patent is extended or adjusted under 35 U.S.C. 154(b) by 0 days.

(21) Appl. No.: 09/549,655

(22) Filed: Apr. 14, 2000

(51) Int. Cl.[7] .......................... G01B 13/02; G01B 13/18
(52) U.S. Cl. ............................ 33/700; 33/701; 73/37.5
(58) Field of Search .......................... 33/605, 732, 733, 33/DIG. 15, 700, 701, 837; 73/37.5, 37.8, 158, 195, 198

(56) References Cited

U.S. PATENT DOCUMENTS 2,981,094 A * 4/1961 Lehmann et al. ............ 73/37.5
3,084,541 A * 4/1963 Raugé ........................ 33/837
3,187,560 A * 6/1965 Bailey ........................ 73/37.5
5,140,846 A * 8/1992 DeCool et al. .............. 73/37.5
5,163,312 A * 11/1992 Ayers ......................... 73/37.5
5,224,374 A * 7/1993 Ayers ......................... 73/37.5

* cited by examiner

*Primary Examiner*—G. Bradley Bennett
(74) *Attorney, Agent, or Firm*—Henry P. Sartorio

(57) ABSTRACT

A detection apparatus and method reliably determine the position of a hydraulically actuated telescoping boom. The detection system is built right into the hydraulic piston apparatus which is used to extend and retract the telescoping boom. A pair of flow meters is used to measure the flow rate into and out of the hydraulic cylinder. In some cases, only a single flow meter at either the inlet or outlet may be used. The measured flow signals are input into a processor which determines piston position and boom position.

15 Claims, 2 Drawing Sheets

BOOM POSITION DETECTION SYSTEM

BACKGROUND OF THE INVENTION

The invention relates to hydraulically actuated telescoping booms, where a hydraulic piston is used to extend or retract an external object, particularly as found on heavy construction machinery, and more particularly to method and apparatus for detecting the position of the boom.

In the heavy construction industry, especially in the mobile crane industry, it is necessary to know the position of hydraulically actuated moving parts, e.g. booms, which extend from machines, e.g. cranes, in order to avoid serious accidents. Thus, sensors or measuring devices are installed on the equipment to measure the boom length on telescoping booms, as well as boom angles, extension distances on outriggers, and the travel distances to foot pads located on outriggers.

In the case of telescoping booms, a device called a "cable reel" is installed to measure boom extension distances. The cable reel device consists of a circular wrapped coil of wire which is slowly pulled out of a circular reel when the boom is telescoped out. The distance of the boom travel is measured as a function of the number of revolutions of the cable reel.

A major problem with this conventional approach to measuring boom travel or distance is due to the external position of the measuring device, e.g. cable reel. Because it is mounted on the outside of the boom, it becomes subject to the environmental influence of wind, rain, mud, dirt, and shock, and often comes in contact with tree branches and other objects located within the construction area. As a direct result of these environmental factors, and in combination with the control actions of the equipment operator, the reliability of the cable reel is relatively low, more than one failure per 3050 hours of operation.

Therefore it is desirable to more reliably measure the distance of travel of a hydraulically actuated boom telescoping out or in from a crane or similar equipment, including but not limited to bucket loaders, dump trucks, grade levelers, aerial work platforms, tractors, combines, and bulldozers.

SUMMARY OF THE INVENTION

Accordingly it is an object of the invention to provide a method and apparatus for reliably measuring the distance of travel of a hydraulically actuated telescoping boom.

It is another object of the invention to provide a detection system for measuring the distance of travel of a hydraulically actuated telescoping boom which is better and more reliable than a cable reel system.

The invention is a method and apparatus for reliably measuring the distance of travel of a hydraulically actuated telescoping boom by measuring the flow rate of the hydraulic fluid used to actuate the boom. By measuring the flow rate of hydraulic fluid into or out of a fixed diameter hydraulic cylinder, and integrating under this fluid flow function over a period of time, the volume of hydraulic fluid which has been transferred into or out of the hydraulic cylinder in that period of time is mathematically determined. Once the volume of fluid is known in a fixed size hydraulic cylinder, the distance of piston travel is easily determined. Once the location of the piston is determined within the hydraulic cylinder, the boom length, or the length of any stroke distance, is determined because they are linearly correlated with an r value (Pearson Correlation Coefficient)

approaching 1.0. Thus, boom position is determined from knowledge of piston location within the cylinder, which is determined from simple measurement of hydraulic fluid flow rate.

To implement the invention, a flow meter is placed at the input, e.g. in an input line or in the intake manifold, of the hydraulic cylinder, and another flow meter, preferably of the same type and make, is placed at the outlet, e.g. in an outlet line or in the exhaust manifold, of the cylinder. While a single flow meter at either the input or output may be used, the use of two flow meters, one at the intake and one at the exhaust of the hydraulic cylinder, greatly increases reliability. The signals from the flow meters (or single flow meter) are input into a processor which calculates the boom position. Zero calibration is automatically nulled using a microswitch when the piston reaches its minimum or maximum position in the cylinder. If a vertical piston is also used to push a boom up and down about a pivot point, then the system can be used to determine boom angle as well as boom extension.

The invention is applicable to hydraulically actuated booms and similar extendable elements which are extended from or retracted into a hydraulic cylinder by a hydraulic piston. In particular, the invention can be used for heavy construction machinery.

DETAILED DESCRIPTION OF THE INVENTION

The invention is a detection apparatus and method for reliably determining the position of a hydraulically actuated telescoping boom. (As used herein, the term "boom" includes all similar elements which extend externally from a hydraulic cylinder.) The detection system is built right into the hydraulic piston apparatus which is used to extend and retract the telescoping boom. A pair of flow meters is used to measure the flow rate into and out of the hydraulic cylinder. In some cases, only a single flow meter at either the inlet or outlet may be used. The measured flow rate signals are input into a processor which determines piston position and boom position.

Figure 1:
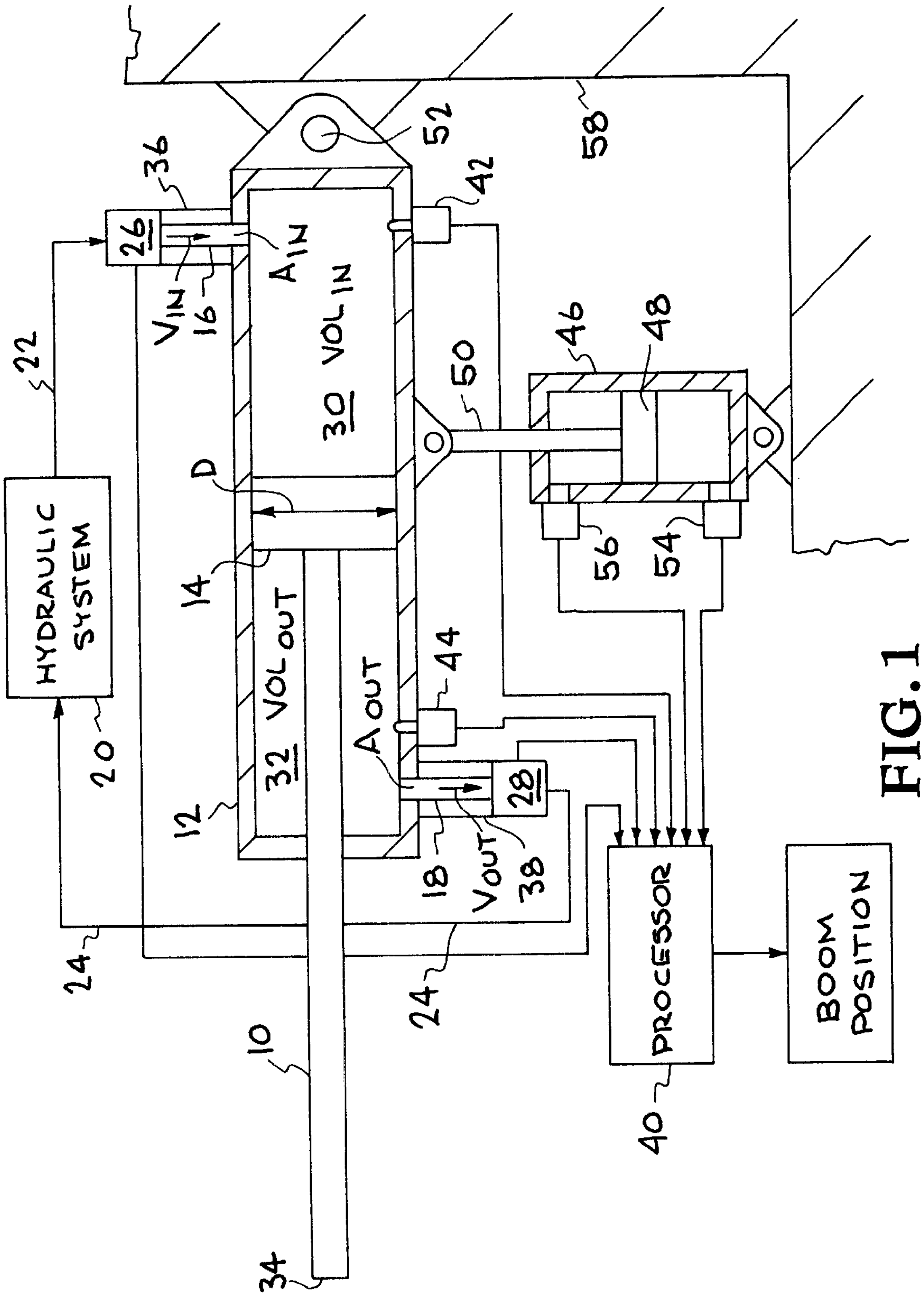
FIG. 1 is a schematic view of a hydraulically actuated telescoping boom position detection system according to the invention.

A telescoping boom 10 actuated by a hydraulic cylinder 12 is illustrated in FIG. 1. Boom 10 is attached to piston 14 which is positioned within cylinder 12 and has a diameter $D_{piston}$. A hydraulic system 20, which includes a hydraulic fluid reservoir, pumps, etc., is connected to inlet or intake port 16 and outlet or exhaust port 18 of hydraulic cylinder 12 by hydraulic lines 22, 24 respectively. Inlet port 16 has an inlet area of $A_{in}$ and outlet port 18 has an outlet area of $A_{out}$. Hydraulic system 20 maintains hydraulic fluid in the inlet chamber 30 and outlet chamber 32 of the cylinder 12. Inlet chamber 30 has a volume $VOL_{in}$ and outlet chamber 32 has a volume $VOL_{out}$ which change as a function of piston position.

By applying more pressurized hydraulic fluid to inlet chamber 30, fluid is ejected from outlet chamber 32 and piston 14 is displaced to the left to extend the telescoping boom 10 outwardly. If the system is reversed (inlet and outlet reversed) so that more pressurized hydraulic fluid is applied to chamber 32, fluid is ejected from chamber 30 and piston 14 is displaced to the right to retract the telescoping boom 10. As the boom 10 is operated in this manner, it is desirable to know the position of the distal end 34 of boom 10. This can be determined by determining the position of piston 14 in cylinder 12.

In accordance with the invention, a first flow meter 26 is positioned, e.g. in input hydraulic line 22 or in an intake manifold 36, to measure the flow of hydraulic fluid through the inlet port 16. A second flow meter 28 is positioned, e.g. in outlet hydraulic line 24 or in an exhaust manifold 38, to measure the flow of hydraulic fluid through the outlet port 18. In a simpler embodiment of the invention, only a single flow meter can be used. However, the dual flow meter embodiment is preferred because of the increase in reliability thereby obtained. The dual flow meters are preferably the same type and model so that they operate consistently.

With flow meter 26 placed at the inlet 16, the velocity of the hydraulic fluid being injected into cylinder 12 can be measured. If $V_{in}$ is the velocity of the hydraulic fluid and $A_{in}$ is the inlet area, then the volume flow rate $Q_{in}$ is given by:

$$Q_{in}=V_{in}A_{in}. \quad \text{(Eq 1)}$$

Assuming that the hydraulic fluid is incompressible, then the rate of change in the cylinder volume at the inlet side ($VOL_{in}$) is equal to the inlet volume flow rate. Thus:

$$\frac{dVOL_{in}}{dt}=Q_{in}. \quad \text{(Eq. 2)}$$

Figure 2:
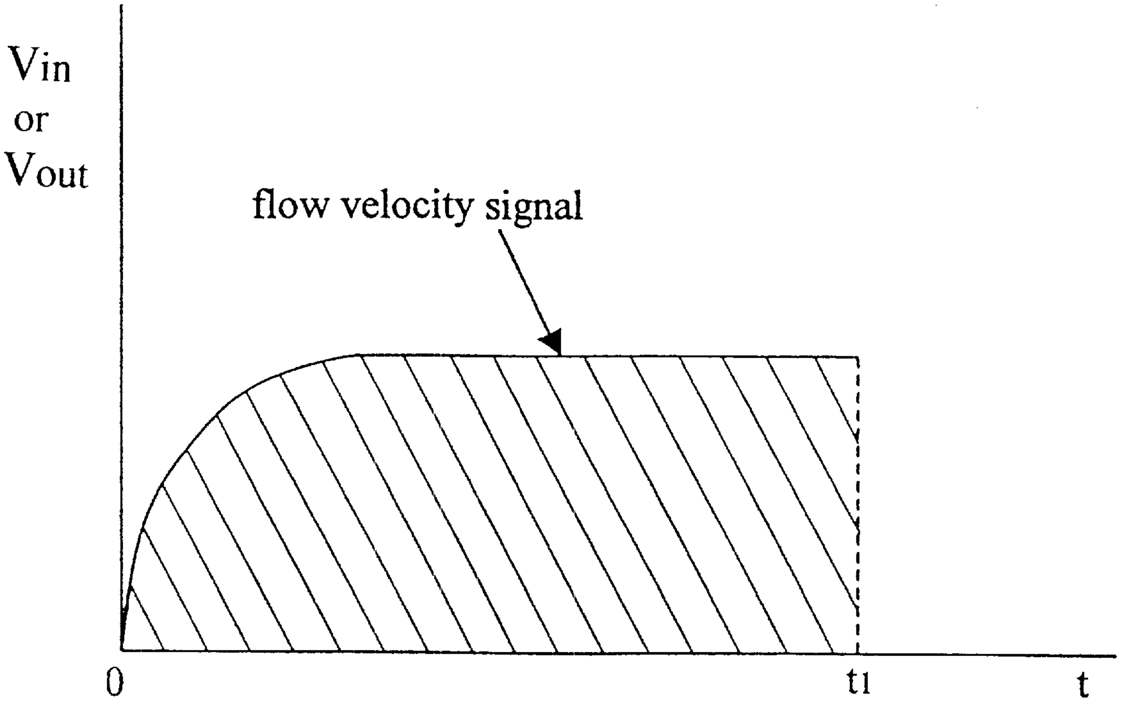
FIG. 2 is a graph of a flow velocity signal from a flow sensor in the boom position detection system.

FIG. 2 shows a signal output from a flow sensor. This signal represents the inlet (or outlet) flow velocity as a function of time. The total amount of change in the cylinder volume, $\Delta VOL_{in}$, over a period of time from 0 to t1 is proportional to integrating this signal from time 0 to time t1, i.e. determining the area under the flow velocity curve. Therefore:

$$\Delta VOL_{in}=\int_0^{t1}\frac{dVOL_{in}}{dt}dt=\int_0^{t1}C(V_{in})A_{in}dt. \quad \text{(Eq. 3)}$$

where C is a calibration constant for the flow meter signal.

The change in the linear movement of the piston, Δl, is inversely proportional to the square of the piston diameter $D_{piston}$ since the change in volume equals the change in linear piston movement times the cross sectional area of the cylinder. Thus:

$$\Delta l=\frac{\Delta VOL_{in}}{\frac{\pi}{4}(D_{piston})^2}. \quad \text{(Eq. 4)}$$

Therefore, if the inlet flow velocity for the hydraulic fluid is measured, the total linear change in cylinder position is given by:

$$\Delta l=\frac{4}{\pi}\frac{C}{(D_{piston})^2}A_{in}\int_0^{t1}V_{in}dt. \quad \text{(Eq. 5)}$$

The only variable is the fluid velocity; everything else is a constant.

Therefore, the output signals from flow meters 26, 28 are input into a processor 40 in which the above calculations are performed to determine the change in piston position. From the change in piston position, the position of the boom is determined . The change in boom position is the same as the change in piston position, i.e. Δx=Δl, and the tip of the boom (at position $X_B$) is linearly separated from the piston (at position $X_P$) by the boom length L, i.e. $X_B=X_P+L$. While the above equations have been given in terms of the inlet side of the system, similar equations apply to the outlet side. The same equations also apply when the system is reversed to retract the boom rather than extend the boom.

The zero position can easily (and automatically) be calibrated with this system. A pair of microswitches 42, 44 are placed in the cylinder 12, e.g. in the cylinder wall, at the minimum and maximum positions of the piston 14. Thus when piston 14 reaches its minimum or maximum position in the cylinder, the microswitch 42 or 44 will be actuated, sending a signal to processor 40.

The system can also be used to determine boom angle as well as boom extension. A vertically oriented cylinder 46 can be coupled to cylinder 12 which actuates boom 10 (or to boom 10 itself). Cylinder 46 is used to change the angular orientation of cylinder 12 and thus boom 10. When piston 48 in cylinder 46 is hydraulically actuated, the attached coupling boom 50 pivots cylinder 12 about pivot point 52 to raise and lower boom 10. The vertical displacement of boom 50 provides data from which processor 40 can calculate the boom angle Θ of boom 10 with respect to the horizontal. At least one of a pair of flow meters 54, 56 are connected to the input and output of cylinder 46 to measure the fluid flow rate from which the position of piston 48 and boom 50 can be determined. The horizontal and vertical components $X_{BX}$, $X_{BY}$ of boom tip 34 are then given by:

$$X_{BX}=X_B\cos\Theta=X_p\cos\Theta+L\cos\Theta$$

$$X_{BY}=X_B\sin\Theta=X_p\sin\Theta+L\sin\Theta$$

The invention also includes the method, described above with reference to the operation of the apparatus, of determining the boom position by measuring the flow velocity of the hydraulic fluid, calculating the change in volume in the cylinder, and calculating the change in piston position.

Thus the invention provides an improved method and apparatus for determining boom position, both extension and angle. By using two flow meters, one at each end of the hydraulic cylinder, reliability is increased from 1 failure per 3050 hours to less than 1 failure per 10,000,000 hours of operation. The present system is less expensive than prior art cable and reel systems, and is not subject to the wide variety of environmentally induced failure modes of the cable and reel system.

The invention is applicable to virtually all hydraulic systems, to measure distance associated with the stroke movement of the piston or any external attachment connected to the piston. Thus the invention could be used on cranes, bucket loaders, dump trucks, grade levelers, aerial work platforms, tractors, combines, bulldozers, and other machines. In FIG. 1, support platform 58 represents any machinery or equipment on which hydraulically actuated mechanisms of the type described herein are mounted.

Changes and modifications in the specifically described embodiments can be carried out without departing from the scope of the invention which is intended to be limited only by the scope of the appended claims.

What is claimed is:

1. Apparatus for detecting the position of a hydraulically actuated telescoping boom extending from a piston in a hydraulic cylinder, comprising:

at least one flow meter positioned to measure the flow velocity of hydraulic fluid input into or exhausted out of the hydraulic cylinder while the boom is being extended or retracted;

a processor receiving flow velocity output signals from the at least one flow meter and programmed to calculate the position of the piston and boom from the flow velocity output signals and geometric parameters of the cylinder and piston.

2. The apparatus of claim 1 wherein the at least one flow meter comprises a pair of flow meters, one to measure the flow velocity of hydraulic fluid being input into the cylinder and the other to measure the flow velocity of hydraulic fluid being exhausted from the cylinder.

3. The apparatus of claim 1 wherein the geometric parameters are the inlet or outlet area through which the hydraulic fluid is input into or exhausted from the cylinder, and the piston diameter.

4. The apparatus of claim 2 wherein the geometric parameters are the inlet or outlet area through which the hydraulic fluid is input into or exhausted from the cylinder, and the piston diameter.

5. The apparatus of claim 1 wherein the at least one flow meter is positioned in an inlet hydraulic line to the cylinder or an output hydraulic line from the cylinder.

6. The apparatus of claim 2 wherein one flow meter is positioned in an inlet hydraulic line to the cylinder and the second flow meter is positioned in an output hydraulic line from the cylinder.

7. The apparatus of claim 1 wherein the at least one flow meter is positioned in an intake manifold to the cylinder or an exhaust manifold from the cylinder.

8. The apparatus of claim 2 wherein one flow meter is positioned in an intake manifold to the cylinder and the second flow meter is positioned in an exhaust manifold from the cylinder.

9. The apparatus of claim 1 further comprising a pair of microswitches positioned in the cylinder, one at the minimum position of the piston and the other at the maximum position of the piston, and connected to the processor to provide calibration signals for the endpoints of piston travel.

10. The apparatus of claim 1 further comprising a second hydraulic cylinder coupled to the boom to change the angle of the boom, and at least one additional flow meter associated with the second cylinder, wherein the processor is also programmed to calculate the angle of the boom from flow velocity output signals from the at least one additional flow meter and geometric parameters of the second cylinder.

11. A method for detecting the position of a hydraulically actuated telescoping boom extending from a piston in a hydraulic cylinder, comprising:

measuring the flow velocity of hydraulic fluid input into or exhausted out of the hydraulic cylinder while the boom is being extended or retracted;

calculating the position of the piston and boom from the measured flow velocity and geometric parameters of the cylinder and piston.

12. The method of claim 11 further comprising measuring the flow velocity of both hydraulic fluid input into and hydraulic fluid exhausted out of the hydraulic cylinder.

13. The method of claim 11 wherein the geometric parameters are the inlet or outlet area through which the hydraulic fluid is input into or exhausted from the cylinder, and the piston diameter.

14. The method of claim 12 wherein the geometric parameters are the inlet or outlet area through which the hydraulic fluid is input into or exhausted from the cylinder, and the piston diameter.

15. The method of claim 11 wherein the position of the boom is calculated by first integrating the measured flow velocity to determine volume change in the cylinder and then dividing the volume change by the piston area to determine piston displacement.

* * * * *